April 8, 1952   A. G. GRANATH   2,591,929
CONVEYER TROUGH
Filed Nov. 5, 1948
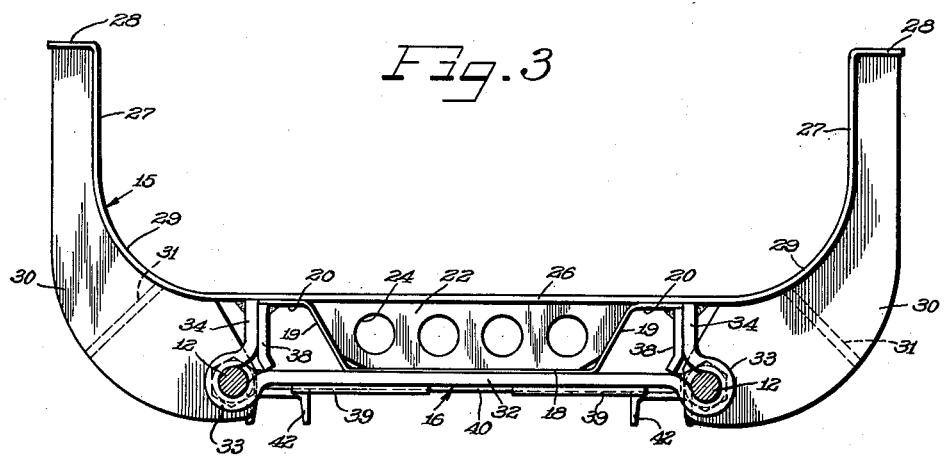
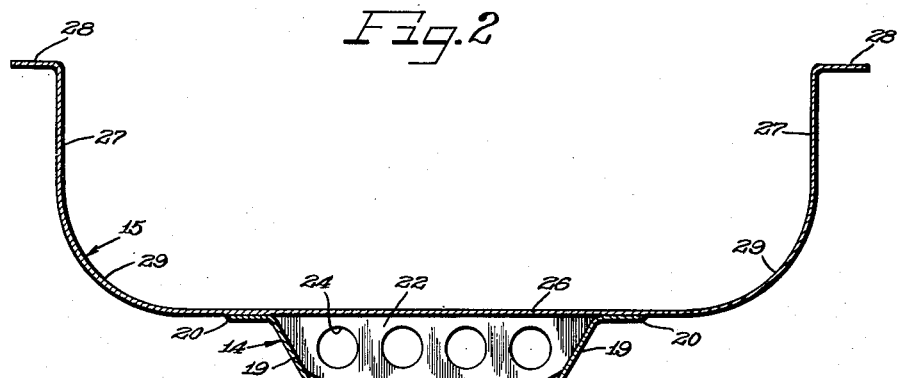
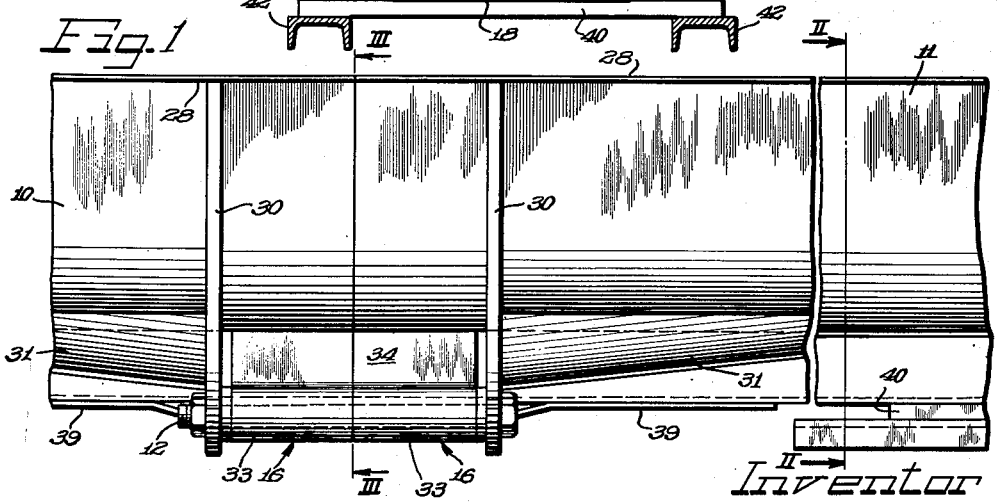
Inventor
Axel G. Granath Patented Apr. 8, 1952

2,591,929

UNITED STATES PATENT OFFICE 2,591,929

CONVEYER TROUGH

Axel G. Granath, Chicago, Ill., assignor, by mesne assignments, to Herbert S. Simpson, Evanston, Ill., as trustee Application November 5, 1948, Serial No. 58,419

1 Claim. (Cl. 198—220)

The present invention relates to improvements in a conveyor trough. More particularly it has to do with an improved trough having a rigid frame and a carrying pan suitable for conveying heavy objects and withstanding impact loads.

Conveyor troughs have been used heretofore which employ elongated pans for supporting material as it is slid along the conveying surface thereof from one station to another. This pan type of conveyor is usually designed with a view to making it light in weight, and as a result no conveyor trough has been heretofore provided that will give satisfactory performance under impacts due to the loading of heavy articles, such as steel castings. Further, conventional pan type conveyors have a tendency to buckle under heavy loads which are subjected to a high temperature such as is ordinarily encountered in foundries.

It is therefore an important object of the present invention to provide a conveyor trough of sturdy, rigid construction, capable of resisting heavy impact loads and capable of conveying heated articles with no buckling of the pan.

Another object of the present invention is to provide a conveyor trough having a rigid frame which, when attached to the rigid frames of other identical troughs, forms a substantially rigid longitudinal conveyor capable of withstanding heavy impact loads and of conveying heavy loads of heated articles.

According to the features of this invention there is provided a conveyor trough including a pan of heavy gauge metal having a continuous flat conveying surface bordered by upstanding side walls. The pan is rigidly mounted on horizontal ledges disposed on the end of the side arms of an elongated base member which has a flat U-shaped configuration in transverse cross section. Web plates are welded laterally across the inside of the support member to provide rigidity and strength to the base and vertical web plates are secured to the outer side of the wall members of the pan laterally of the trough to help resist any force tending to cause the side walls to bend away from the conveying surface of the pan.

The base member, due to its web type bracing, provides in effect an elongated rigid column and affords exceptional strength for supporting heavy loading or resisting impacts delivered to the pan thereabove. The trough may conveniently be supplied in lengths of approximately twelve feet and provisions may be made for connecting several lengths together to form a continuous, rigid support structure.

Other and further features, advantages and objects of the present invention will be apparent to one skilled in the art from the following detail description taken in connection with the accompanying drawings.

On the drawings:

Figure 1 is a fragmentary side elevational view showing the ends of two trough sections secured together according to the teaching of the present invention;

Figure 2 is a vertical sectional view taken substantially on line II—II of Figure 1; and Figure 3 is a vertical sectional view taken substantially on line III—III of Figure 1.

As shown on the drawings:

The conveyor trough of the present invention may advantageously be used in a "shaker" type conveying system wherein material is slid along the conveying surface due to the trough being moved bodily forwardly at a first speed and then stopped and accelerated in a rearward direction at a greatly advanced rate of speed. The material is thus advanced along the surface due to the fact that surface is being repeatedly pulled from under it.

In Figure 1 reference numerals 10 and 11 represent individual trough sections secured end-to-end by bolts 12.

Each trough section comprises a base assembly 14 (Figure 2), a pan assembly 15 secured to the base assembly 14, and end connectors 16 (Figure 1) secured to the pan and to the base at either end of the trough.

The base assembly 14 includes a flat bottom panel 18, inclined side panels 19 extending upwardly from the bottom panel 18, and ledge portion 20 projecting laterally from the top edges of the side panels 19. The base assembly 14 may be integrally formed or may be fabricated from individual members. Transverse webs 22 are disposed between the side panels 19 of the base assembly, being secured as by welding to the bottom panel 18 and to the side panels. Web member 22 may suitably be disposed at approximately twelve inch intervals along the length of the base. A plurality of apertures 24 are provided in each web member 22 to lighten the weight of the member while retaining most of the strength thereof.

The pan assembly 15 is preferably formed of a single sheet of heavy gauge metal and bent to define a flat conveying surface 26, side walls 27, and ledges 28. The junction of the side walls 27 and the conveying surface 26 may conveniently take the form of a rounded portion 29.

A side web brace 30 is disposed near either end of the trough on the outer side of the pan assembly. As best seen in Figure 3, the web 30 extends downwardly along the side wall 27 of the pan and along a portion of the bottom face of the conveying surface 26. The web brace 30 may be secured, as by welding, on each side of the trough near the end point thereof to provide rigidity to the side walls of the pan. A slanted longitudinal reinforcing plate 31 is disposed between the web 30 and the base of the pan assembly.

The pan 15 is secured, as by welding, to the ledges 20 of the base assembly 14.

Each of the connectors 16 which are disposed at each end of each trough includes a flat central band portion 32 (Figure 3) and an eye portion 33 at each end thereof. A leg 34 extends upwardly from each eye for welding securement to the pan 15. A substantially vertical reinforcing member 38 extends along the length of the trough on each side thereof in abutting relation with each leg portion 34 of the connector 16. The upper end is secured as by welding to the ledge 20 of the base assembly and the lower end is secured to the connector 16.

As a means of further strengthening the trough, straps 39 are secured to the bottom face of the connector 16 (Figure 3) and extend longitudinally of the trough for welding connection to the bottom face of the base (Figure 1).

To provide support for the trough assembly, a plate 40 is disposed longitudinally immediately below the base and secured thereto as by welding. The plate 40 extends for substantially the entire length of the trough. A pair of tracks 42 may be secured to the underside of the plate 40.

In one method of operating the trough of this invention, the tracks 42 will be disposed on rollers (not shown) to provide means for supporting the trough as it is reciprocated back and forth to move the material therealong.

It will be noted that while the connectors 16 are used to connect trough sections, the connector 16 at one end of the trough assembly may be used to receive a drive rod (not shown) which may be suitably connected to a shaker mechanism (not shown) for actuating the conveyor trough.

From the foregoing description it will be recognized that there is provided in this invention a novel conveyor trough including an elongated transversely braced base portion on which is supported a novel pan of heavy gauge metal having a plurality of vertically disposed web braces. Provision is made for securing a plurality of these novel conveyor troughs in aligned abutting relation providing a composite base structure for a conveyor trough which is in substantial alignment and is rigid enough to withstand heavy loads without buckling or bending out of alignment.

The pans, when aligned end-to-end and connected together, provide a rigid drive column for support on conventional rollers. This so-called column can be perfectly lined up, and should any buckling or distortion occur in the pans it would not substantially effect the alignment of the pans.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

A column type shaper conveyor trough structure comprising a trough having a bottom and side walls, reinforcing webs extending downwardly from the bottom of said trough adjacent its outer margins and laterally from the side walls thereof, connecting eyes abutting said webs and extending in advance thereof and a load carrying structure for said trough connected between said webs and with said webs and eyes forming a column reinforcing the bottom of the trough for the entire length thereof, said base comprising a plurality of longitudinally spaced transverse web members secured to the bottom of said trough and depending therefrom, a bottom panel extending between said webs and secured to the bottoms of said web members and extending upwardly along opposite sides thereof and along the bottom of said trough, and being secured thereto, a reinforcing plate extending along the bottom of said bottom panel and a pair of downwardly facing tracks depending from and extending along opposite sides of said plate.

AXEL G. GRANATH.

REFERENCES CITED

The following references are of record in the file of this patent:

UNITED STATES PATENTS

| Number | Name | Date |
|---|---|---|
| 1,937,593 | Rich | Dec. 5, 1933 |
| 2,149,158 | Bergmann | Feb. 28, 1939 |
| 2,420,085 | Long et al. | May 6, 1947 |